UNITED STATES PATENT OFFICE.

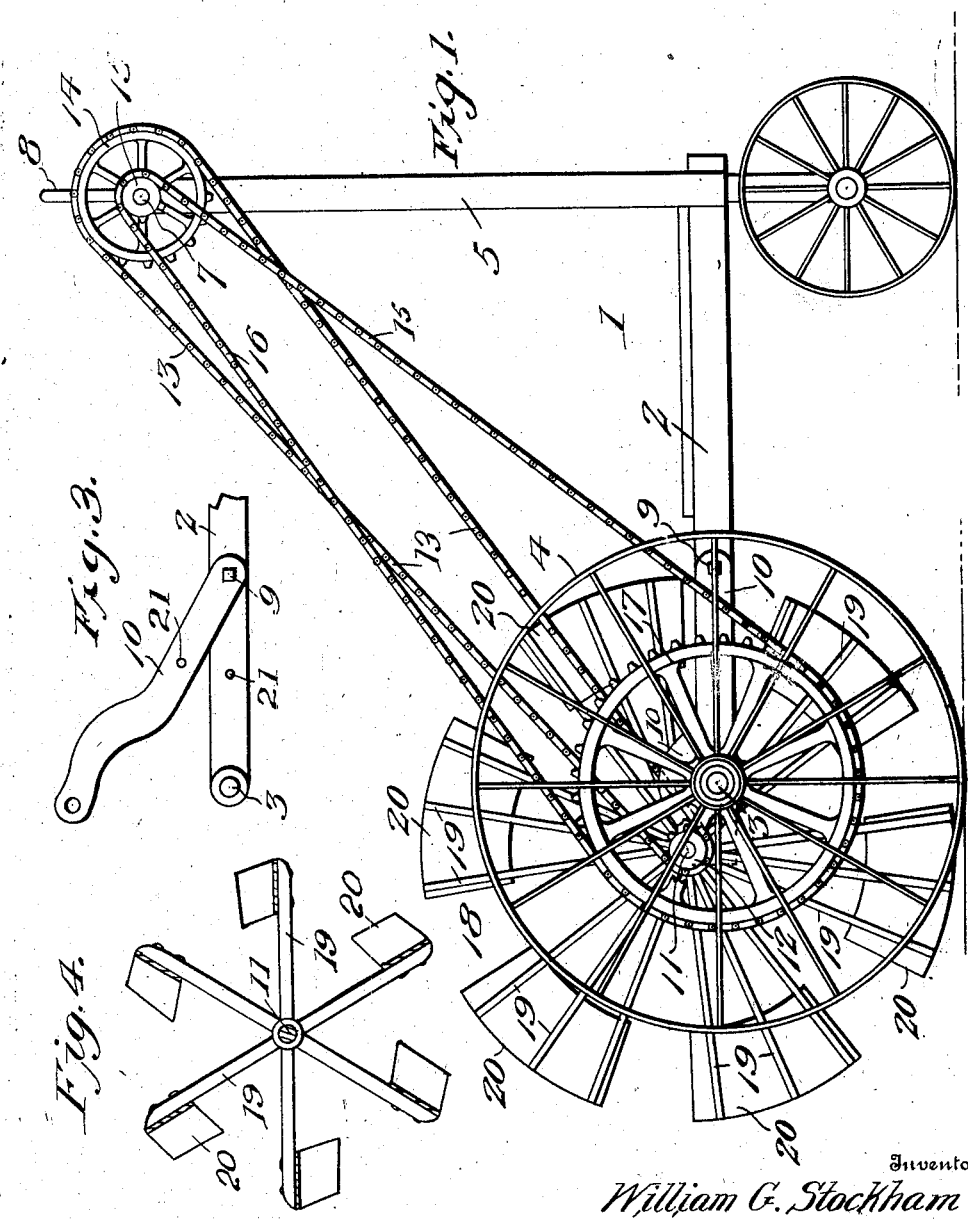

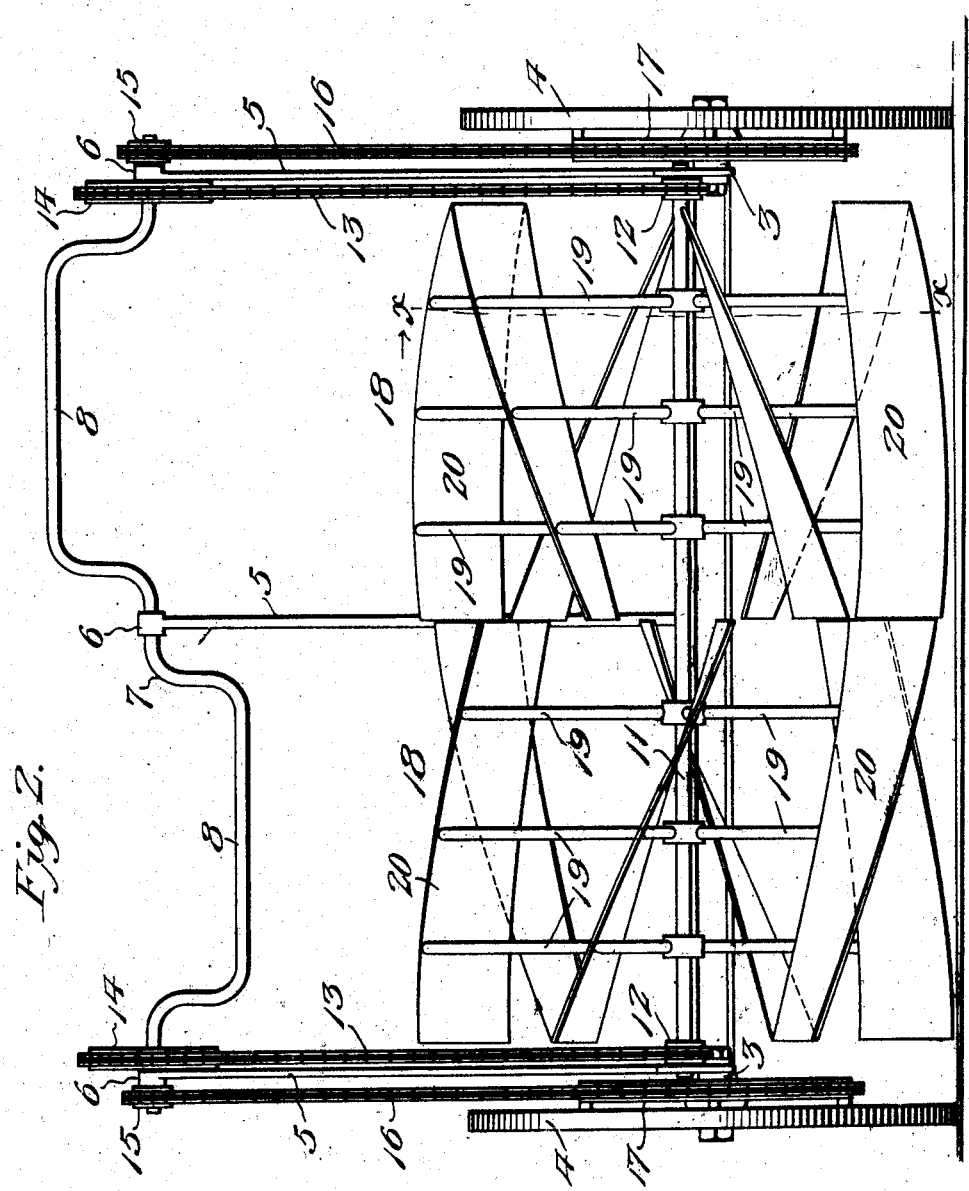

WILLIAM G. STOCKHAM, OF PIQUA, OHIO.

SAND-MIXER.

No. 823,710.　　　Specification of Letters Patent.　　Patented June 19, 1906.

Application filed November 10, 1904. Serial No. 232,238.

*To all whom it may concern:*

Be it known that I, WILLIAM G. STOCKHAM, a citizen of the United States, residing at Piqua, in the county of Miami and State of Ohio, have invented new and useful Improvements in Sand-Mixers, of which the following is a specification.

In the preparation of sand in foundries for use in molding it is common to work the same by hand through the instrumentality of a shovel or like implement, which is manipulated to toss the sand and insure a thorough working, mixing, or kneading thereof, so to speak, whereby it is lightened, the ingredients blended, and a homogeneous mass assured.

This invention provides a machine which may be moved over the sand or material to be worked thrown in a pile or ridge upon the floor or other support, said machine comprising a mixing or kneading device for working the material simultaneously with the travel of the machine thereover, said mixing device comprising elements which move the material back and forth at the same time with its movement in the direction of travel of the machine.

The invention contemplates propelling means and connections between the mixer and propelling means, whereby both are simultaneously operated, the mixer being driven at a higher rate of speed than the propelling means.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side elevation of a sand-cutter embodying the invention. Fig. 2 is a rear end elevation of the device. Fig. 3 is a detail view of one of the pivoted arms for carrying the cutter-shaft. Fig. 4 is a transverse section of the mixing or kneading device on the line $x x$ of Fig. 2 looking in the direction of the arrow.

Referring to the drawings, 1 designates a frame comprising a pair of spaced parallel side bars 2, carrying at their rear ends stub-shafts or axles 3, on which are mounted for rotation transporting-wheels 4, and at their forward ends vertically uprising bars or standards 5, having at their upper ends bearings 6, in which a double-crank shaft 7 is journaled for rotation, said shaft being provided with oppositely-extended crank portions 8.

Pivoted to the bars 2, as at 9, is a pair of oppositely-disposed swinging members or arms 10, provided at their rear ends with suitable bearings for the reception of a transverse rotary shaft 11, having fixed thereon adjacent its ends sprocket-pinions 12 for the reception of endless chains 13, engaged with sprocket-wheels 14, fixed on the crank-shaft 7, there being also fixed upon said shaft sprocket-pinions 15, carrying chains 16, engaged with sprocket-wheels 17, mounted upon the axles 3, and fixedly engaged with the ground-wheels 4 for driving the latter. Under this arrangement it will be seen that as the crank-shaft 7 is operated power will be transmitted therefrom by the chains 16 to the wheels 4 and through the medium of the chains 13 to the shaft 11, the relative sizes of the sprocket-wheels and pinions being such that the speed of rotation of the ground-wheels comparative with that of the crank-shaft will be materially reduced, while a high rate of speed will be imparted to the shaft 11 for a purpose which will be more fully hereinafter described.

Carried by the shaft 11 for rotation therewith is a mixing or kneading device consisting of a pair of rotary members or wheels 18, each comprising a plurality of spiders 19 and cutting-blades 20, attached to the outer ends of the arms or webs of said spiders. The cutting-blades 20 of each wheel or rotary member have a parallel relation to one another and are set lengthwise in a spiral or diagonal direction with their width on radial lines. The spiral or diagonal arrangement admits of the blades moving the sand transversely of the machine, whereas the radial disposition of the blades enables their edges to readily penetrate the sand and their broad flat sides to act as paddles in lifting and tossing the material. The blades of one rotary member or wheel are similarly inclined in an opposite direction to the blades of the other rotary member or wheel, with the result that the material is worked toward the center and ridged in the rear of the machine. The blades have a staggered or alternate arrangement—i. e., the blades of one member are located opposite the spaces between the blades of the other member, so that the blades of the two wheels will alternately and successively act upon the material and in passing through the latter impart a whirling or vortex motion thereto, thereby rapidly and thoroughly breaking and separating the sand. In practice when it is desired to position the machine over a pile of sand to be treated the arms 10, which are normally fixed in position by means of pins (not shown) inserted through holes 21, are released and swung upward, thereby elevating the shaft 11 and wheels 13 to permit passage of the latter over the sand. After the machine has been properly positioned the wheels are again lowered and the arms fixed in place by means of the pins to thus permit of the blades acting upon the sand during rotation of the shaft. During the operation of the crank-shaft the cutter-shaft 11 will, as before stated, be driven at a high rate of speed for effecting a rapid cutting and breaking of the sand by the blades 20, while at the same time the wheels 4 will be driven at a proper and comparatively slower rate of speed for causing the machine to travel slowly over the pile of material being acted upon.

From the foregoing it is apparent that I produce a simple compact device which may be readily operated and one which in practice will efficiently perform its functions in the attainment of the ends in view, it being understood that minor changes in the details set forth may be resorted to without departing from the spirit of the invention.

Having thus described the invention, what is claimed as new is—

1. In a device of the class described, a frame having transporting-wheels, a shaft sustained by the frame and operatively connected with and for driving the transporting-wheels, a second shaft operatively connected with and driven by the first-named shaft, and cutting-blades carried by the second shaft.

2. In a device of the class described, a frame having transporting-wheels, a rotary crank-shaft carried by the frame, a gear connected with and for driving one of the transporting-wheels, a chain connection between said gear and crank-shaft, a cutter-shaft, cutting-blades carried thereby, and a gear and chain connection between the crank-shaft and cutter-shaft for driving the latter.

3. In a device of the class described, a frame having transporting-wheels, a gear fixed for rotation with one of said wheels, a rotary crank-shaft sustained by the frame, a pinion fixed on said shaft, a chain traveling upon and connecting the gear and pinion for driving the transporting-wheel from the crank-shaft, a cutter-shaft, cutting-blades carried thereby, a pinion fixed on the cutter-shaft, a gear fixed on the crank-shaft, and a chain operatively connecting the latter gear and pinion, whereby the cutter-shaft is driven from the crank-shaft.

4. In a device of the class described, a frame having transporting-wheels, a cutter-shaft carried by the frame, cutting-blades carried by the shaft, and a power-shaft sustained by the frame and operatively connected with and for simultaneously driving both the ground-wheels and cutter-shaft.

5. In a device of the class described, a frame having transporting-wheels, arms pivoted to the frame for vertical swinging movement, a cutter-shaft carried by the arms for movement therewith, cutting-blades on said shaft, a power-shaft, operative connections between the power-shaft and transporting-wheels and also between the power-shaft and cutter-shaft.

6. In a device of the class described, a frame having transporting-wheels, a pair of arms pivotally connected with the frame to swing in a vertical plane, a cutter-shaft carried by and for movement with the arms, means for normally fixing the arms against movement, cutting-blades carried by the shaft, a power-shaft sustained by the frame, and operative connections between the power-shaft and cutter-shaft for driving the latter.

7. In a device of the class described, a frame having transporting-wheels, a shaft journaled in the frame, mechanism for driving said shaft, and a pair of cutter members fixed upon and for rotation with the shaft, said members each comprising arms radiating from the shaft and blades attached to and carried by the arms, said blades being arranged in pairs each pair formed from a single length of material bent adjacent its longitudinal center upon itself and the blades of the respective members being arranged in relatively staggered relation and spirally twisted from end to end.

8. A machine for working sand or like material in bulk, the same comprising a frame, a mixing or kneading device mounted upon or carried by the frame and comprising elements arranged to work the material in the plane of movement of the machine and simultaneously back and forth to effect a blending and a ridging thereof, propelling means supporting the said frame, and actuating means for the mixing or kneading device and for the said propelling means mounted upon the frame to admit of the machine being run backward and forward.

9. A machine for working sand or like material in bulk, the same embodying a mixing or kneading device comprising blades alternately inclined in opposite directions to the plane of movement of the machine, and actuating means for said mixer or kneader to effect a blending and working of the material by a combined tossing and back-and-forth movement thereof without scattering or spreading.

10. A machine for working sand or like material in bulk, the same comprising a mixing or kneading device and means for rotating said device, said rotary mixer comprising blades alternately inclined in opposite directions lengthwise thereof to simultaneously toss the material in the plane of travel of the machine and move it back and forth to effect a thorough blending without scattering or spreading thereof.

In testimony whereof I affix my signature in presence of two witnesses.

WILLIAM G. STOCKHAM.

Witnesses:
J. E. WHITLOCK,
J. W. DUPUY.